US010740483B2

(12) United States Patent
Aakolk et al.

(10) Patent No.: US 10,740,483 B2
(45) Date of Patent: Aug. 11, 2020

(54) UNIFIED INSTANCE AUTHORIZATION BASED ON ATTRIBUTES AND HIERARCHY ASSIGNMENT

(71) Applicant: SAP SE, Walldorf (DE)

(72) Inventors: Michael Aakolk, Walldorf (DE); Bernhard Drabant, Walldorf (DE); Andrea Waldi, Walldorf (DE)

(73) Assignee: SAP SE, Walldorf (DE)

( * ) Notice: Subject to any disclaimer, the term of this patent is extended or adjusted under 35 U.S.C. 154(b) by 238 days.

(21) Appl. No.: 15/358,176

(22) Filed: Nov. 22, 2016

(65) Prior Publication Data

US 2018/0144150 A1 May 24, 2018

(51) Int. Cl.
| | |
|---|---|
| *G06F 7/04* | (2006.01) |
| *G06F 21/62* | (2013.01) |
| *G06F 16/245* | (2019.01) |
| *G06F 16/28* | (2019.01) |
| *G06F 16/22* | (2019.01) |
| *G06F 21/60* | (2013.01) |
| *H04N 7/16* | (2011.01) |

(52) U.S. Cl.
CPC ...... *G06F 21/6218* (2013.01); *G06F 16/2282* (2019.01); *G06F 16/245* (2019.01); *G06F 16/282* (2019.01); *G06F 16/289* (2019.01); *G06F 21/604* (2013.01)

(58) Field of Classification Search
CPC ......... G06F 17/30339; G06F 17/30424; G06F 17/30589; G06F 17/30607; G06F 21/6218; G06F 21/604

USPC ........................................ 726/2, 3, 4, 21, 28
See application file for complete search history.

(56) References Cited

U.S. PATENT DOCUMENTS

| | | | | |
|---|---|---|---|---|
| 2003/0182565 | A1* | 9/2003 | Nakano | H04L 9/0822 713/193 |
| 2005/0007964 | A1* | 1/2005 | Falco | H04L 67/1089 370/256 |
| 2005/0203836 | A1* | 9/2005 | Woodward | G06Q 20/10 705/39 |
| 2006/0010483 | A1* | 1/2006 | Buehler | G06F 21/6227 726/1 |
| 2007/0208746 | A1* | 9/2007 | Koide | G06F 21/6218 |
| 2008/0244736 | A1* | 10/2008 | Lampson | G06F 21/604 726/21 |
| 2009/0089291 | A1* | 4/2009 | Daily | G06Q 10/10 |

(Continued)

*Primary Examiner* — Gary S Gracia
(74) *Attorney, Agent, or Firm* — Fish & Richardson P.C.

(57) ABSTRACT

A data model is defined to describe objects. Attributes from the data model are associated with providing authorization right for executing actions on object instances of the objects. A hierarchy of object groups is declared. Objects group collections are defined on top of the hierarchy. A vocabulary including definitions of attributes of objects and including definitions of assignments of objects to object groups is created. The vocabulary is related to determining authorization rights for executing actions based on attributes and hierarchy organization of objects. A capability to determine authorization to perform an action by a user on a set of objects is defined based on the vocabulary. When a request for performing an action by a user on object instances is received, a filtering expression based on the capability is generated to be included in a where clause of a query.

19 Claims, 10 Drawing Sheets

(56) References Cited

U.S. PATENT DOCUMENTS

| | | | |
|---|---|---|---|
| 2009/0132906 A1* | 5/2009 | Aoki | G06F 40/154 715/234 |
| 2010/0042909 A1* | 2/2010 | Tanahashi | G06F 40/194 714/799 |
| 2011/0078195 A1* | 3/2011 | Bertolini | G06F 16/20 707/783 |
| 2011/0277017 A1* | 11/2011 | Ivanov | G06F 21/6218 726/4 |
| 2012/0042362 A1* | 2/2012 | Vlasov | G06F 21/604 726/4 |
| 2012/0150912 A1* | 6/2012 | Ripberger | G06F 16/24573 707/786 |
| 2013/0081141 A1* | 3/2013 | Anurag | G06F 21/577 726/23 |
| 2013/0185564 A1* | 7/2013 | Jaber | G06F 21/572 713/176 |
| 2014/0068238 A1* | 3/2014 | Jaber | H04L 63/061 713/2 |
| 2015/0120699 A1* | 4/2015 | Faerber | G06F 16/221 707/718 |
| 2015/0172320 A1* | 6/2015 | Colombo | H04L 63/105 726/1 |
| 2016/0132537 A1* | 5/2016 | Batides | G06F 16/80 707/804 |
| 2017/0046151 A1* | 2/2017 | Hsu | G06F 8/654 |
| 2017/0085383 A1* | 3/2017 | Rao | G06F 8/654 |
| 2017/0134373 A1* | 5/2017 | Li | H04L 63/061 |

* cited by examiner

UNIFIED INSTANCE AUTHORIZATION BASED ON ATTRIBUTES AND HIERARCHY ASSIGNMENT

BACKGROUND

User accounts may be created to control access to applications. A user name and a password may be assigned to a person or business partner who works with an application. User roles may be assigned to accounts, and determine types of access that users are allowed when using the application. For example, a group of users may be defined, where a user from the group may view an application's content and make changes to that content. Such a group of users may be assigned to the role "Author". An application's administrator can modify access rights for defined roles or create new roles.

The object instances associated with the application may be associated with different authorization rights for different users. The object instances may be defined based on a data model, including a definition of attributes for the objects. Object instances may be organized in a hierarchical manner according to hierarchy criteria, such as location, time, etc. When users log in an application, they provide their user names and passwords to start an authentication process. Authenticated users may perform actions and/or operations on object instances associated with the application. User may be part of different user groups having different roles. Authenticated users group include users whose identities were authenticated when they logged in the application.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

DETAILED DESCRIPTION

Embodiments of techniques for defining unified instance authorization based on attributes and hierarchy assignment of object instances are described herein. in the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may he combined in any suitable manner in one or more embodiments.

Figure 1A:
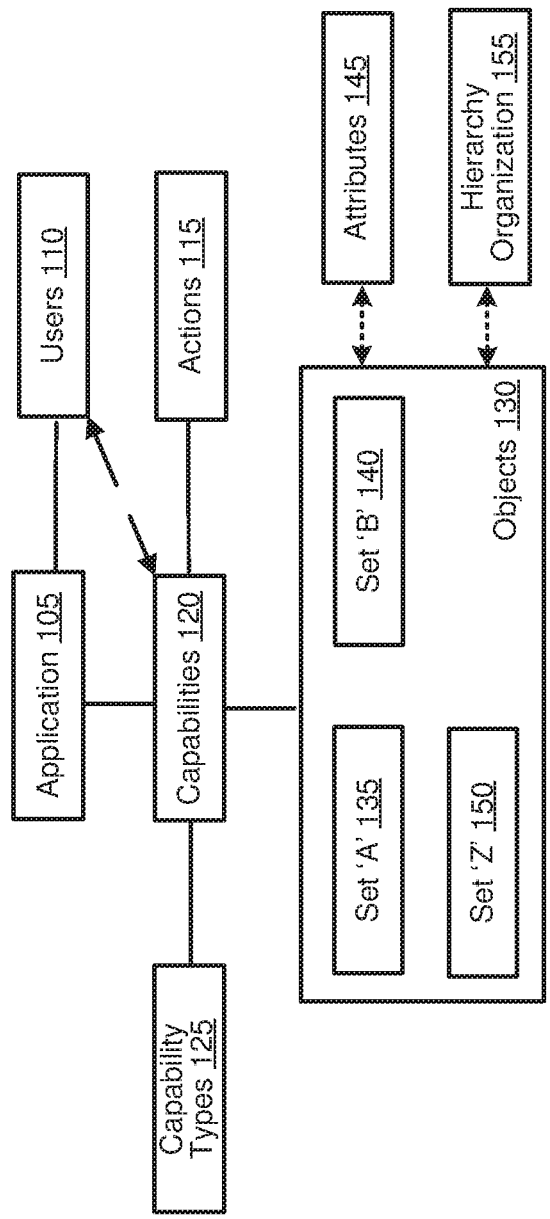
FIG. 1A is a block diagram illustrating an exemplary system for providing user authorization to execute actions on object instances based on defined capabilities, according to one embodiment.

FIG. 1A is a block diagram illustrating an exemplary system 100 for providing user authorization to execute actions on object instances based on defined capabilities, according to one embodiment. Application 105 is a software application or an application service, which provides functionality to be consumed by users 110. Users 110 may be associated with different roles and may be able to perform different tasks based on authorization rights. A definition of the authorization rights for object instances associated with an application may be provided in relation to specified actions. The authorization rights may be determined based on attributes of the objects instances and on hierarchy organization of the object instances. For example, a user may be allowed to enter information associated with clients in the application 105. Users 110 may be allocated into user groups. The application 105 is associated with capabilities 120. The capabilities 120 specify how different rights are provided to users 110 for performing relevant actions on relevant sets of objects. The capabilities 120 are associated with a list of actions defined in block Actions 115. The capabilities 120 are associated correspondingly with objects 130 that are related to the application 105. The objects 130 are associated with provided functionality based on implemented logic of the application 105. A user from users 110 may be associated with a capability X from the capabilities 120. The capability X may define that the user is authorized to perform an action, such as a read operation, on a given object or a set of objects from objects 130. For example, the capability X may be associated with a single object from the objects 130, or may be associated with a group of objects, for example, grouped based on a common characteristic, order, etc. In one example, the objects 130 may be divided into different groups, such as set "A" 135, set "B" 140, and/or set "Z" 150.

The objects 130 may be defined according to an object model defining different attributes, such as attributes 145. Data for the objects 130 may be stored in database tables including attributes (columns) to describe the object instances. An object from the objects 130 may be associated with one or more attributes from the attributes 145. The objects 130 may also be associated with a hierarchy organization 155. The hierarchy organization 155 may specify hierarchical relationships between groups of objects. The hierarchy organization 155 comprises hierarchy levels, which may be used to allocate an object to a certain hierarchy level. For example, hierarchy organization may be defined for objects that are associated with different locations, which may be generalized in a hierarchy order. A location hierarchy order may be such as world, country, region, city, etc.

In one embodiment, the capabilities 120 may be defined on an attribute basis and on hierarchy basis. In such manner, the capabilities are defined with a unified authorization approach to both attributes and hierarchy organization. Objects from the objects 130 are associated with actions from the actions 115. The capabilities 120 may be defined in relation to specific actions and associated objects. Objects are associated with an action based on criteria related to the attributes 145 and the hierarchy organization 155. Capability types 125 serve as a template for the capabilities 120. The Capability types 125 include definitions of a mapping between authorization rights, users, and objects from objects 130. Properties of a given capability are defined by the capability type, from which it is derived. In some embodiment, the Capability types 125 may be treated as low-level content. The Capacity types 125 may be hard-coded, predefined and delivered by the application product provider.

Based on a received request from a user to perform an action, the application 105 may provide an authorization result to the user, which specifies whether the user is authorized to perform the requested action on objects from the objects 130. Capabilities may be used to determine how to determine the authorization results that are given to users in relation to the objects 130. An evaluation of the objects 130 may be. performed through filtering the objects based on the defined capabilities. A filtering term may he defined when evaluating whether the user has authorization rights to perform an action X on requested object Y. When a filtering term, defined in relation to object Y, is evaluated to true, then the user may be authorized to execute the action X. The corresponding capability types may he used to determine whether capabilities with associated actions and determined filter terms are well defined.

Figure 1B:
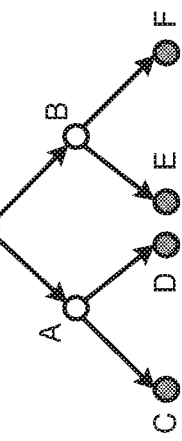
FIG. 1B is a block diagram illustrating an exemplary definition of object instances according to an entity model including defined attributes and a hierarchy organization, according to one embodiment.

FIG. 1B is a block diagram illustrating an exemplary hierarchy organization 160 of object instances, defined on an entity model including attributes, according to one embodiment. Objects, such as the objects 130 discussed in relation to FIG. 1A, may be organized in the hierarchy organization 160 including hierarchy levels of separation between object groups. For example, the objects may include object instances 165—objects C, D, E, and F. The object instances 165 may be grouped in object groups 167—groups A and B. The objects C, D, E, and F, may be defined according to a model 170, which includes a set of tables—table 1, table 2, and table 3. The tables include a list of attributes, which may be represented as columns of the tables. Such list of attributes defines characteristics of the objects C, D, E, and F. The model 170 may include relationships between the tables. In the hierarchy organization 160, objects C and D are part of group A, and objects E and F are part of group B. The definition of these groups A and B is on a hierarchy basis. For example, if the objects represent goods, one exemplary hierarchy organization may be the associated location of goods- Europe for group A, and North America for group B.

Figure 2:
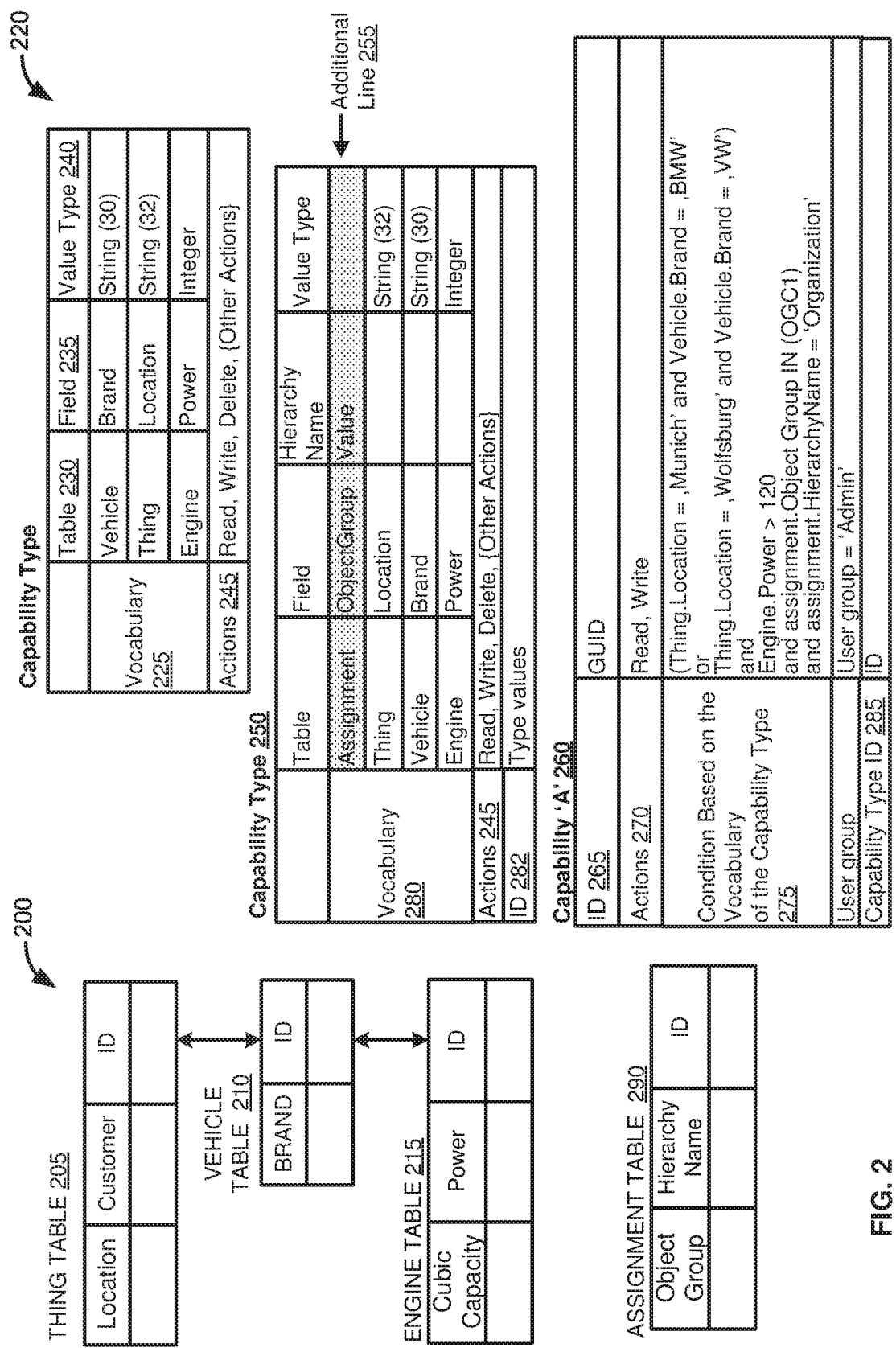
FIG. 2 is a block diagram illustrating an exemplary model for defining objects and a vocabulary related to a definition of a capability, according to one embodiment.

FIG. 2 is a block diagram illustrating an exemplary model 200 for defining objects and a vocabulary related to a definition of a capability, according to one embodiment. The exemplary model 200 includes definitions of entity types. The entity types are presented as tables, which include column fields. The exemplary model 200 may be used for creating objects such as objects 130, FIG. 1A. The objects may be associated with an application and authorization rights for actions to be performed by users. The exemplary model 200 includes a thing table 205, a vehicle table 210, and engine table 215. The exemplary model 200 describes objects based on the defined fields in the tables. The column fields in the tables from the exemplary model 200 are attributes of the objects instances that are created based on the exemplary model 200. The thing table 205 includes column fields—location, customer, identifier (ID). The vehicle table 210 includes column fields—brand, identifier (ID) The engine table 215 includes column fields—cubic capacity, identifier (ID). The thing table 205, vehicle table 210 and the engine table 215 may he linked based on key fields, such as the ID field.

In one embodiment, for the exemplary model 200 a capability type 220 may be defined. The capability type 220 is created to specify authorizations for performing actions over objects from the entity types defined in the exemplary model 200. The capability type 220 can be capability type 125 described above with respect to FIG. 1A which is associated with capabilities 120 for the application 105. The capability type 220 may be an example of a number of capability types, which may be defined for an application. The capability type 220 may be associated with the exemplary model 200. The exemplary model 200 is associated with a main table, which is thing table 205. Therefore, in the current FIG. 2 we may denote that capability type 220 is a "thing" capability type. The capability type 220 includes a definition of a vocabulary 225 and a definition of actions 245. Objects created based on the exemplary model 200 may be associated with authorization rights to perform actions based on attributes of the objects. The vocabulary 225 is created for the exemplary model 200 to include attributes of objects instances, which are relevant for determining authorization rights for users over object instances. The vocabulary 225 includes attributes corresponding to the defined fields in the entity tables. The vocabulary 225 defines a set of columns corresponding to table names in table 230 column, field names in field 235 column, and value type data for the fields in value type 240 column. The fields 235 column includes the attributes that are associated with authorization. The attributes that are included in the vocabulary are the brand attribute, the location attribute, and the power attributes. Further, the capability type 220 includes a definition of actions 245 that may be performed to object instances, created based on the exemplary model 200. The capability type 220 may be defined to include also a definition of a capability type ID.

The capability type 220 includes the vocabulary 225 having attributes associated with the object instances. The authorization for performing actions over objects may be associated with assignment of object instances into a hierarchy organization. For example, authorization for performing actions may be related to objects that are of a certain brand, but also part of a hierarchy organization of the object instances. As discussed in relation to the hierarchy organization 160, object instances created based on a model may be grouped, and groups may be allocated to hierarchy levels. Such hierarchy may be for example based on the location attribute of object instances. One object instance may have an attribute value for location equal to Munich, and a second object instance may have an attribute value for location equal to Barcelona. Both of these objects may be grouped and associated with a hierarchy level city, and the next hierarchy levels may be country, region, etc. A hierarchy with hierarchy levels, where object groups are defined, includes the notion that object groups of a higher level inherently include object groups from lower levels, where such object groups are in a parent-child relationship to the higher level object group.

Therefore, to reflect the authorization related to hierarchy organization, the capability type 220 may be extended and an enlarged capability type 250 may be created. The capability type 220 may be extended through extending the vocabulary 225 and define a new vocabulary 280. The vocabulary 280 includes the attributes from the vocabulary 225 and also includes an additional line 255 corresponding to an assignment record for the object, where the field column defines the object group to which the object instances is assigned. The assignment of objects to object groups and hierarchies may be stored at an assignment table 290. The assignment table 290 includes columns specifying the object group, an ID, and a hierarchy name. There may be several hierarchies defined for a set of objects. For example, one hierarchy may be defined on an organizational basis, and another hierarchy may be defined in relation to executed sales activities. The additional line 255 also identifiers the hierarchy name for the hierarchy to which the object is assigned. The name of the hierarchy may be taken from an assignment table 290.

In one embodiment, the capability type 250 may be defined to include also a definition of a capability type ID 282. For example, the capability type 250 may be defined for different types of objects, as defined in the exemplary model 200. The "things" stored at the Thing 205 table may be bicycles and cars. Therefore, a capability type ID may reflect the difference of these objects by defining two possible IDs corresponding to bicycles and cars. Therefore, the ID 282 record in the capability type 250 may be associated with predefined ID values corresponding to types of objects.

In one embodiment, the object instances generated based on the model 200 and for which the capability type 250 is defined may also be associated with authorization rights based on assigning of object instances to object group collections. Object group collections may include one or more object groups that have a hierarchical inheritance. The object group may be assigned to be included in a given object group collection. Specific rules for including and excluding objects groups from an object group collection may be declared. For example, an object group collection A includes all of the objects that correspond to object instances associated with "Europe" location, except for object instances from city "Munich".

The vocabulary 280 may include two assignment records, where a second record may correspond to an assignment of an object instance to an object group, which is associated with a second hierarchy definition. The second hierarchy definition may be related to the assignment 290 table. An instance of a Capability Type, such as capability type 220 and capability type 250, may be associated with a user group related to an application providing access to object instances, created based on the exemplary model 200. The object instances may be stored at a database related to the application. The user group may be associated with an application, such as the application 105, FIG. 1A. The capability "A" 260 may also include a capability type ID 285, which relates the capability "A" 260 to a corresponding type of a capability type, which is associated with the capability type ID 280 record.

Capability objects, defined based on a capability type, such as the capability type 250, may be created to specify a set of objects in the database, on which set users may perform actions. Actions of the actions from the capability type are selected when creating the capability object. The multiple dimensions of authorization that are involved in defining a capability may be grouped as presented in Table 1 below.

TABLE 1

| Dimension Authorization | Explanation |
| --- | --- |
| Object set | Set of objects that a user can access defined by a filter expression. The filter expression can be based on specific field values of a particular object instance such that granting the authorization is based on the presence (or absence) of a particular value. The filter expression may be based on expressions including terms generated based on in a vocabulary included in a corresponding capability type, from which the capability is derived. |
| User groups | A set of user groups of which at least one user must be assigned to be able to perform the actions defined by the capability. |
| Actions | different actions (e.g. read, write, delete) that the user (or user group) can perform on the object instances defined by the object set. |

A capability "A" 260 is based on the capability type 250. The capability "A" includes an ID 265, a list of actions 270, and a condition 275. The condition 275 is based on the vocabulary 280 in the capability type 250. The capability "A" 260 defines that for actions "Read" and "Write", object instances that comply with the condition 275 are authorized for the actions 270—"Read" and "Write". in the definition of capability "A" 260, a set of objects for which access is granted may be determined based on evaluation of the condition 275. In the condition 275 field, a complex filter expression can be generated, which allows to restrict access not only to objects of a particular type, but to objects of a particular type with a particular value in one of its fields (or with different values in a list of its fields). Access rights may be defined on a fine level of granularity. For example, such fine level granularity may provide a clear segregation of authority, which is required to fulfill data protection requirements for the application providing access.

Figure 3A:
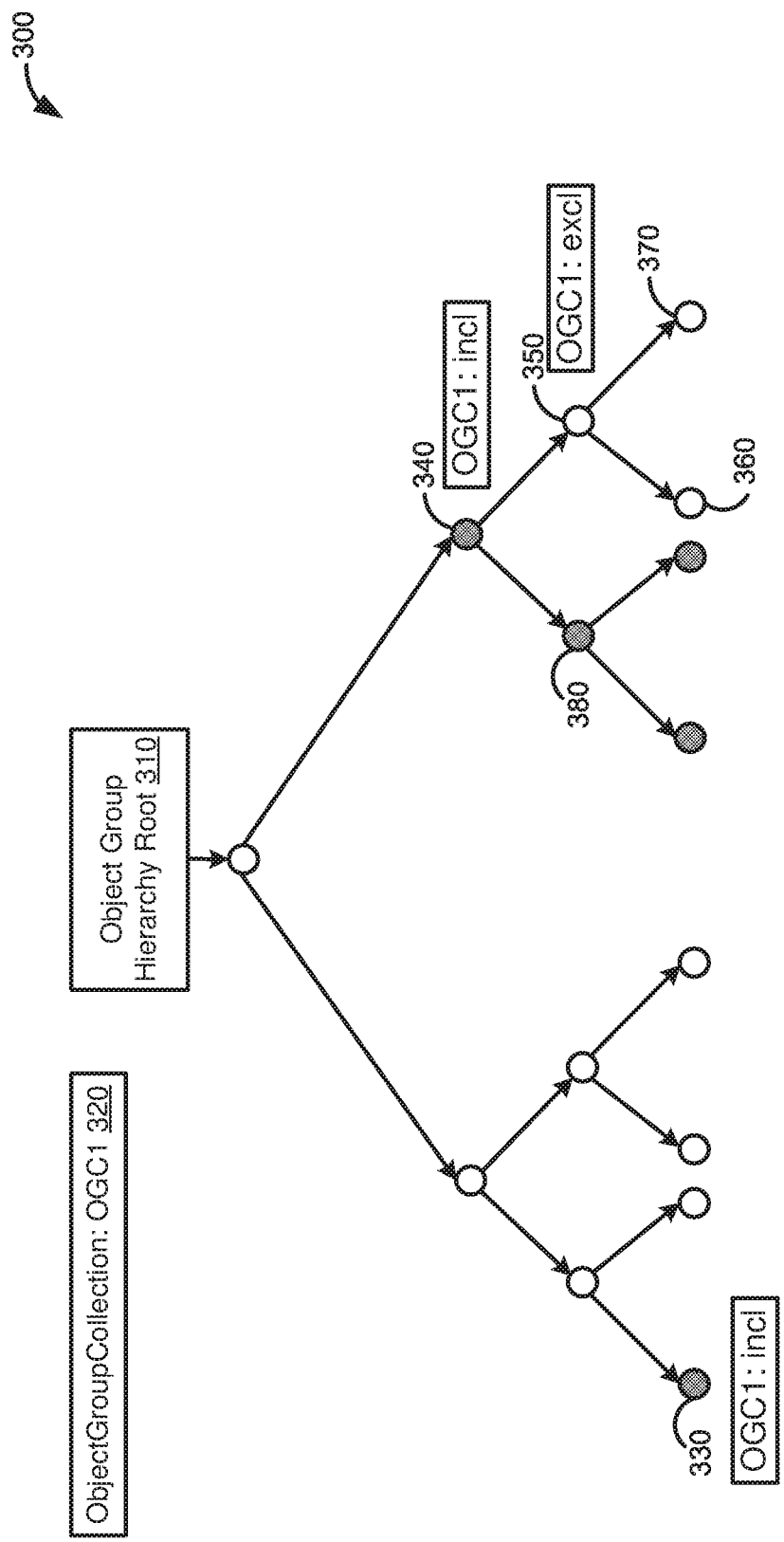
FIG. 3A is a block diagram illustrating a hierarchy organization of object instances and a definition of an object group collection, according to one embodiment.

FIG. 3A is a block diagram illustrating a hierarchy organization 300 of object instances and a definition of an object group collection, according to one embodiment. The hierarchy organization 300 may correspond to the discussed hierarchy organization 160, FIG. 1B. The hierarchy organization 300 may be defined for object instances, stored at a database associated with an application, such as the application 105, FIG. 1A. The hierarchy organization 300 of object instances may be associated with providing authorization rights to users to perform actions on the object instances. The hierarchy organization 300 may be defined to correspond to logic for providing authorization access to object instances in relation to their hierarchy position. A hierarchy organization 300 may include four hierarchy levels to which objects may be allocated. A hierarchy level defines hierarchy characteristics, which are different for different object instances stored at a database. Nodes from the hierarchy organization 300 represent object groups, which are ordered in a hierarchical manner. The hierarchy organization 300 is defined as a tree structure, where an upper hierarchy level comprises object groups with different hierarchy characteristics values. For example, to a hierarchy "Country", the objects instances from a first object group may be associated with country "USA", and a second object group may be associated with country "Canada". The object groups positioned on a hierarchy level of the correspondingly included objects instances. The hierarchy organization 300 includes nodes, which represent different object groups. An object group hierarchy root 310 node corresponds to a higher hierarchy level. A second hierarchy level, below root level, includes 2 object groups, which are distinguishable based on a second hierarchy level criterion correspondingly defined. Based on the hierarchy organization 300 for object groups, object group collections may be defined. An object group collection may include object groups of different levels from the hierarchy organization. An object group at a higher level includes the objects groups, which are in parent child relationships to the object group. The parent-child relationships between object groups are defined and interpreted based on the graph definition for the hierarchy organization 300. in the hierarchy organization 300, object group 340 includes object group 380 and object group 350, and object groups at the lowest third level.

In one embodiment, a collection of object groups "Object Group Collection: OGC1" 320 is defined. The OGC1 320 is such a collection, which includes the crossed marked object group nodes on the hierarchy organization 300. The OGC1 320 includes object group 340. The object group 340 inherently includes the nodes that are linked to it at lower levels. The OGC1 320 may exclude or include some additional object groups defined at the hierarchy organization 300. The OGC1 320 may be defined to exclude object group 350. The object group 350 inherently includes the nodes linked to it at the lower level—object group 360 and object group 370. Therefore, object groups 360 and 370 are also excluded from OGC1 320. The OGC1 320 may be defined to include additionally object instances from object group 330. As a result, the object groups included in OGC1 320 are object group 330 and object group 380, where object group 380 includes the nodes from the graph that are directly linked.

In one embodiment, the hierarchy organization 300 may be rearranged. For example, the nodes from the left handside of the tree structure, may be repositioned below a node from the lowest level of the right-hand side tree. When such a reorganization of the hierarchy arrangement is performed, the inheritance of object groups of lower levels to connected object groups of higher levels is persisted. After such a rearrangement is performed, the interpretation of which groups are associated with a object group collection is about to be updated, and the inheritance of inclusion of object groups is followed according to the new hierarchy organization. For example, if the left hand-side tree is connected to node 370, then all of the nodes from the left hand-side tree are to be excluded from OGC1 320, as all of the nodes are associated with a node—node 370, which is excluded from the OGC1 320.

Figure 3B:
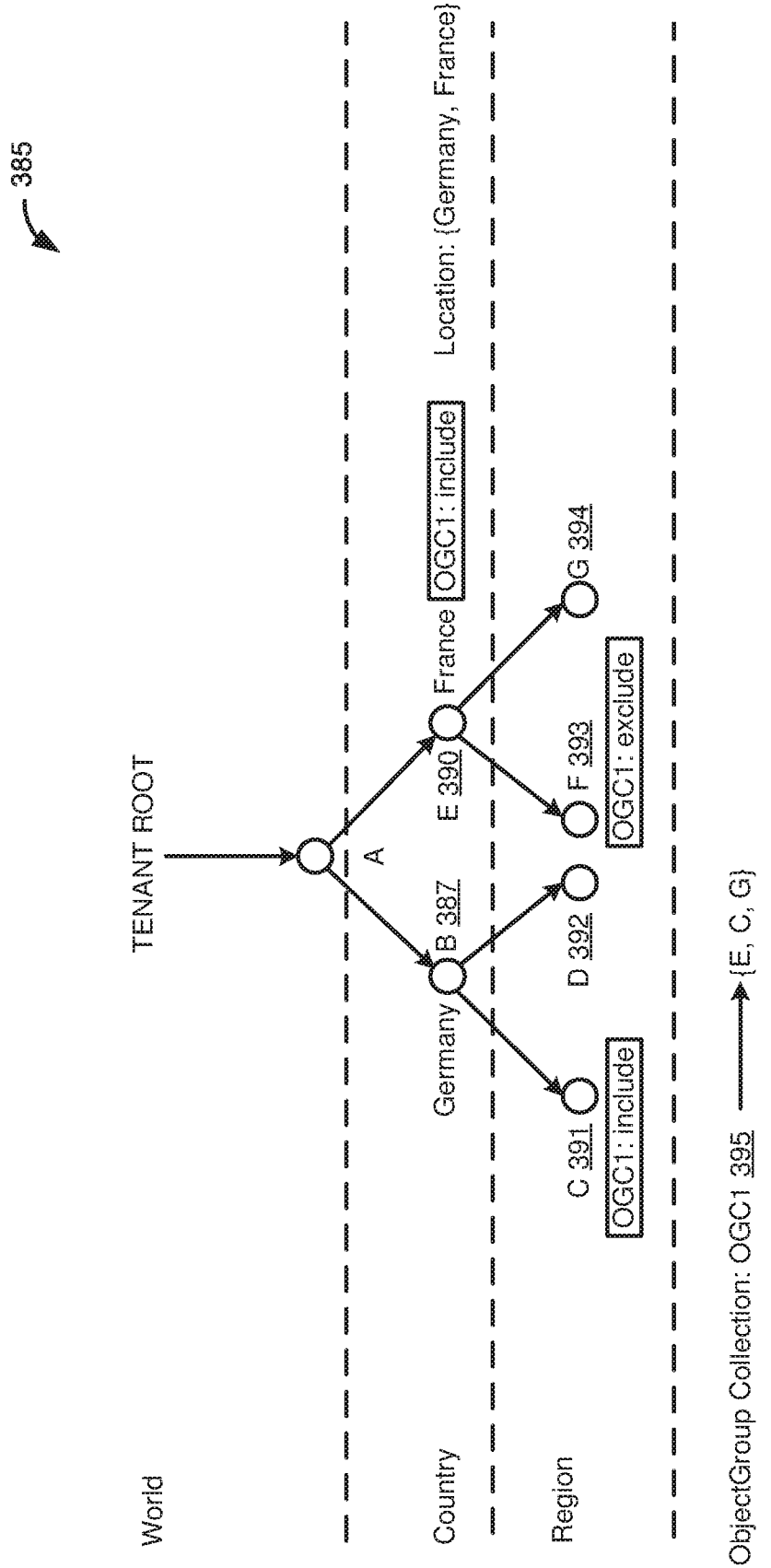
FIG. 3B is a block diagram illustrating an exemplary hierarchy organization of object instances and an exemplary definition of an object group collection, according to one embodiment.

FIG. 3B is a block diagram illustrating an exemplary hierarchy organization 385 of object instances and an exemplary definition of an object group collection, according to one embodiment. The exemplary hierarchy organization 385 of object instances defines a hierarchy associated with a different location. The location of the objects is used to create the hierarchy. The hierarchy may include location hierarchy levels, such as world, country, region, city, etc. The exemplary hierarchy organization 385 presents object groups at 3 hierarchy levels, namely, world, country, and region. At the first hierarchy level—world, there is just one object group, which is the tenant root node. All of the object instances are associated with a location point somewhere in the world.

At a hierarchy level "Country", there are two object groups—object group B 387 "Germany" and object group E 390 "France". At a hierarchy level "Region", there are 4 object groups. Object group C 391 and object group D 392 are child nodes of object group B 387. These object groups—object group C 391 and object group D 392, represent regions in Germany. Object group F 393 and object group G 394 are child nodes of object group E 390. These object groups—object group F 393 and object group G 394, may represent regions in France.

An object group collection—OGC1 395 is defined based on the exemplary hierarchy organization 385. The OGC1 395 is created to include object instances from object group E 390 and object group C 391. Object groups that are inherently connected to object groups E 390 and C 391 are also included in the OGC1. The OGC1 395 may be declared to exclude object instances from object group F 383. Therefore, as a result, the OGCI 395 includes object instances from object groups from the lowest hierarchy level, which are the object group C 391 and the object group G 394, as presented on FIG. 3B.

In one embodiment, a definition of an object group collection may he provided in form of a table, where the collection name is defined together with included object groups. As there is a possibility to explicitly exclude an object group from a collection, where the excluded object group is inherent to previously included object group at a higher hierarchy level, explosion tables may be defined.

In one example, a hierarchy "X" includes an object group 1—OG1, which is inherited by OG1.1 and OG1.2. Hierarchy "X" may be presented in a tree structure having three nodes. A root node for the tree structure may be associated with OG1, and two child notes to the root node are associated with OG1.1 and OG1.2. An OGC1 is created in relation to the hierarchy "X". OGC1 is defined to include OG1 and to exclude OG1.2. Table 2 represents object groups associated with the definition of the OGC1, together with their inclusion status in the collection in the "Included" column. The OGC1, as presented in Table 2, is described based on columns "Object Group", "Object Group Collection" and "Included". The "Object Group" and "Object Group Collection" columns define which is the name of the object group and the corresponding object group collection. Table 2 includes only definition of object groups that are included and object groups that are excluded.

The "Included" column defines two possible values—true and false.

TABLE 2

| Object Group | Object Group Collection | Included |
|---|---|---|
| OG1 | OGC1 | True |
| OG1.1 | OGC1 | False |

The OGC1 includes the OG1 and excludes OG1.1. OG1 is inherited by object groups—OG1.1 and OG1.2. Therefore, the OG1.2 as a direct child to OG1 is inherently included in OGC1. Table 3 presents an explosion table, which includes the OG1.2, which is inherently included in the collection OGC1. The explosion table—Table 3, includes a definition of all of the object groups that are included in the object group collection, no matter if they are inherent to other object groups from Table 3. The rows of the explosion table correspond to the included object groups in the object group collections, where the included objects groups are inherently presented. For example, if object group "A" is inherited by object group "B" and "C", then groups "A", "B", and "C" are presented with rows in the explosion table.

Therefore, Table 3 includes 3 records (rows), corresponding to the 3 object groups—OG1, OG1.1, and OG1.2. For the explosion table—Table 3, an additional column is defined "Valid Object group". As OG1.1 is not included in the OGC1 collection, the valid object group value for group OG1.1 is defined as the name of the group. OG1.2 is inherently included in the OGC1 collection, as a direct inherent node to the OG1.1. Therefore, the value for the valid object group is the same as the value for the group OG1, namely, OG1. The explosion "Table 3" is defined for the object group collection OGC1, where the object group collection name is defined in the "Object Group Collection" column. However, an explosion table may be defined for a number of object group collections, which may be specified in the "Object Group Collection" column. Storing information for the inclusion and exclusion of object groups from defined object group collections in explosion tables may be used when executing filtering terms defined in conditions in capabilities.

TABLE 3

| Object Group | Valid Object Group | Object Group Collection | Included |
|---|---|---|---|
| OG1 | OG1 | OGC1 | True |
| OG1.1 | OG1.1 | OGC1 | False |
| OG1.2 | OG1 | OGC1 | True |

For example, Table 4 includes an exemplary where clause including a filtering term that is based on data stored in an explosion table. The where clause from Table 4 may be included in a query to extract data for objects defined in an hierarchical manner and associated with a specified object group collection.

TABLE 4

WHERE assignment.ObjectGroup in (
SELECT ObjectGroup FROM explosion as e
   INNER JOIN collectionItem as i
     ON e.validObjectGroup = i.ObjectGroup AND
      e. ObjectGroupCollectionID = i. ObjectGroupCollectionID
       WHERE i.included = true AND
        e.ObjectGroupCollectionID = 'Wanted')

Figure 4:
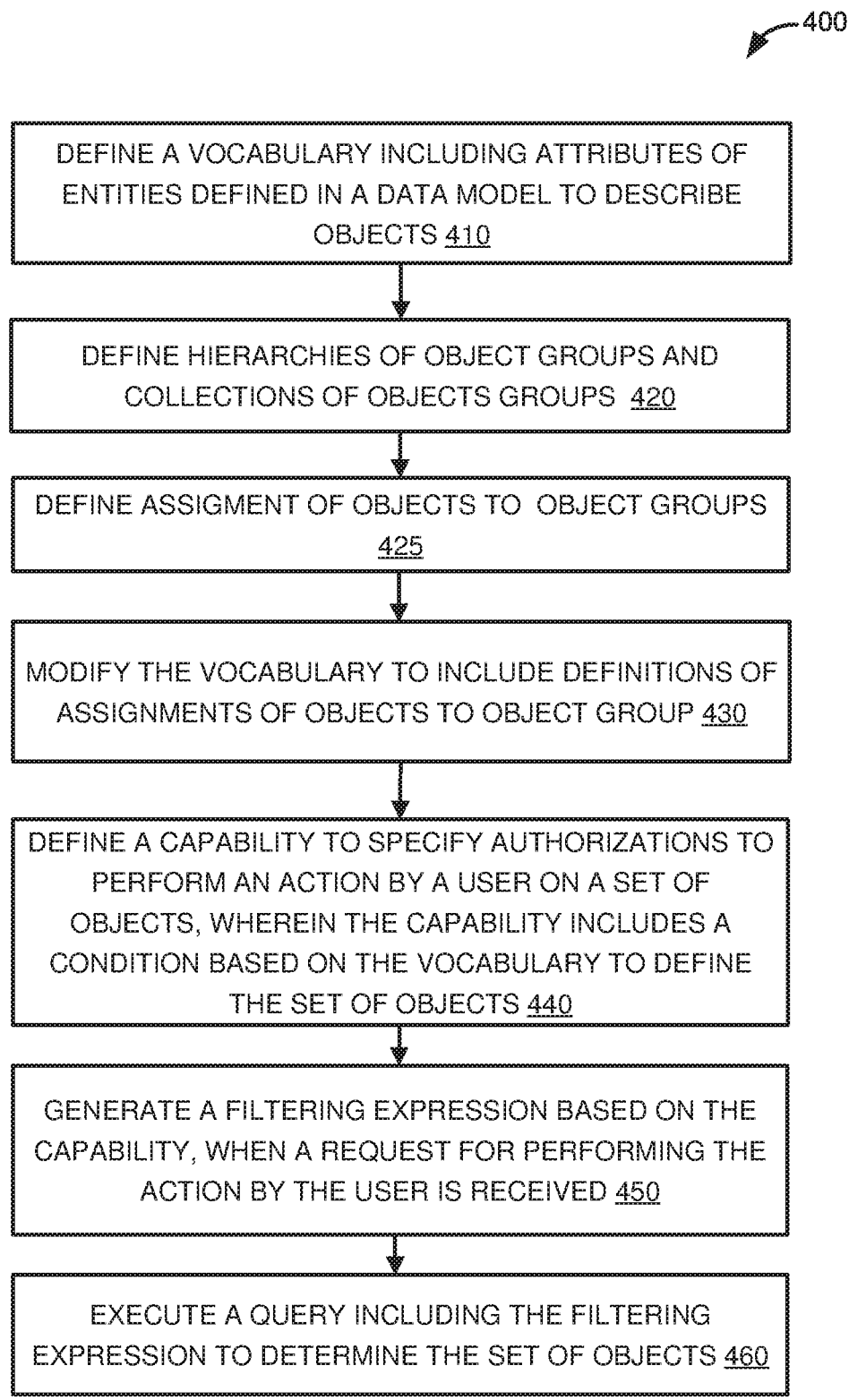
FIG. 4 is a flow diagram illustrating a process for determining authorization rights for executing an action based on attributes and hierarchy organization, according to one embodiment.

FIG. 4 is a flow diagram illustrating a process 400 for determining authorization rights for executing an action based on attributes and hierarchy organization, according to one embodiment. A vocabulary is defined at 410. The vocabulary includes attributes of entities, which are defined in a data model to describe objects. The attributes may be presented as a definition of the attributes' names and the corresponding entities. The vocabulary may be, for example, the vocabulary 280 from the capability type 250 from FIG. 2. The vocabulary is related to providing authorization to perform action on object instances to users of an application. The attributes associated. with the entities may be provided fields of database tables. The database tables may be for a data model for storing data for the objects. The application that provides authorization to perform action may be, for example, the application 105 from FIG. 1A. The authorization to perform actions over object instances may be associated with attributes associated with the object instances and with hierarchy organization of the object instances. The vocabulary may be part of a definition of a capability type for creating capabilities according to the vocabulary, available actions, and relation to users and user groups associated with the application.

At 420, hierarchies of object groups are defined. At 420, object group collections are also defined. The object group collections are defined based on the hierarchies. The hierarchies and object group collections may be, for example, the hierarchy organizations and object group collections described in relation to FIG. 3A and 3B. At 425, an assignment of objects to object groups is created. Such an assignment may be stored as a table, such as the assignment table 290. At 430, the vocabulary is modified to include a definition of assignments of objects to object groups. Such a definition may correspond to the definition of an additional line 255 in the capability type 250 in FIG. 2.

At 440, a capability specifies authorizations to perform an action by a user on a set of objects. The capability is defined to include a condition based on the vocabulary. The conditions in the capability specify how to determine the set of objects for which the user is authorized to perform the action. The capabilities may be such as the capability "A" 260 for the capability type 250 in FIG. 1. The condition associated with the capability may be such as the condition 275, discussed in relation to FIG. 2. The condition may be a complex expression including one or more filtering conditions to determine die set of objects. The filtering conditions may be associated with the attributes of the objects and with the hierarchy organization. At 450, a filtering expression is generated based on the defined capability, when a request for performing the action by the user is received. The request may be received at the application providing access to the object instance, such as the application 105, FIG. 1A. At 460, the filtering expression is executed to determine the set of objects. The filtering expression may be executed against a database, where data for the objects is stored.

Figure 5:
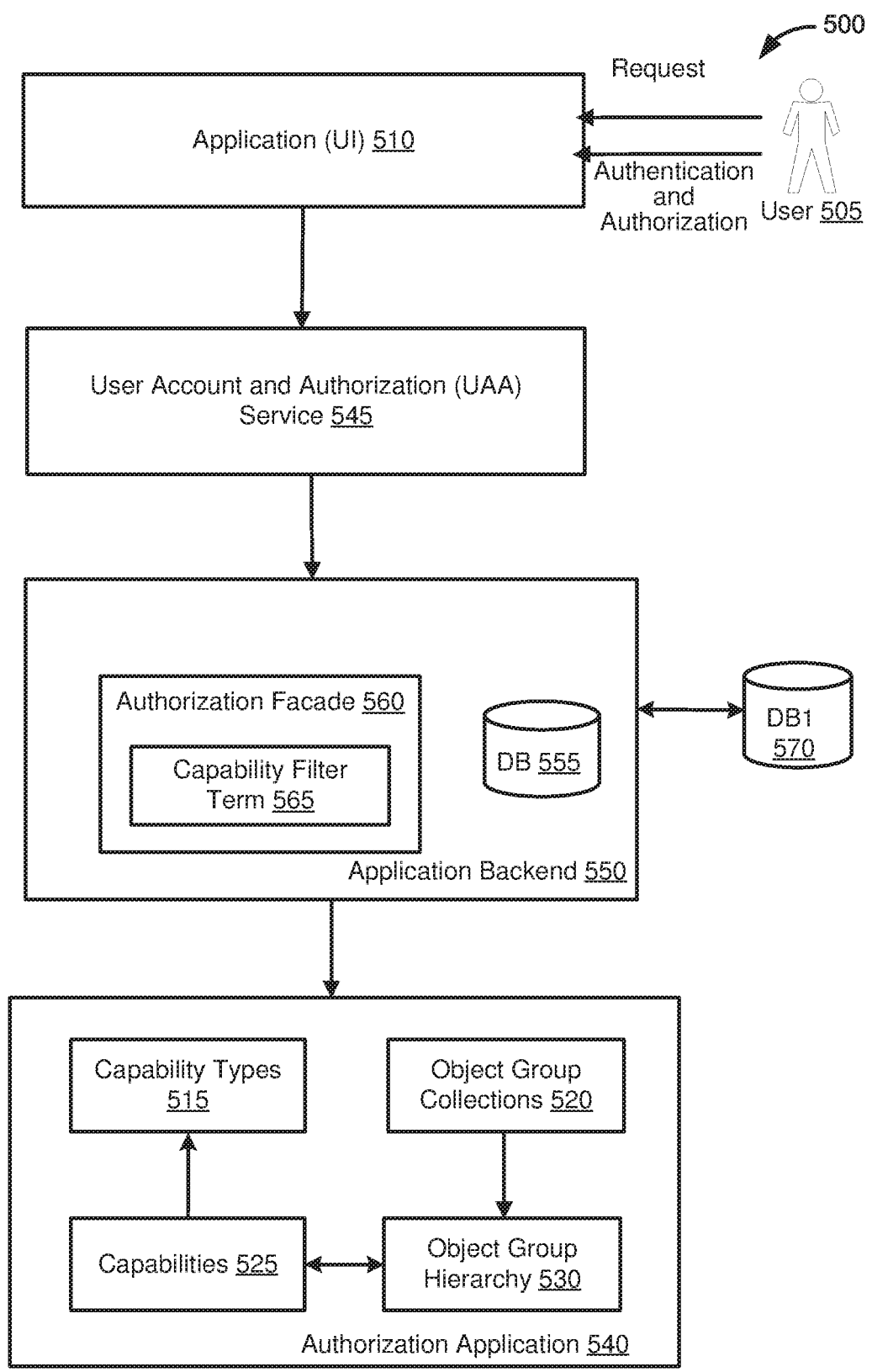
FIG. 5 is a block diagram illustrating a system for determining authorization rights for executing an action based on attributes and hierarchy organization, according to one embodiment.

FIG. 5 is a block diagram illustrating a system 500 for determining authorization rights for executing an action based on attributes and hierarchy organization, according to one embodiment. An application 510 receives user requests, for example, from user 505. Users of the application 510 may be divided into user groups based on their role when working with the application 510. Additionally, users may be associated with different accounts for customers, which may be denoted as tenants. The application 510 may be a user interface (UI) application associated with an application backend 550. The application backend 550 includes implementation logic for providing functionality to users through the application 510. The application backend 550 handles data storage and data management. The application backend 550 communicates with a database "DB1" 570. The application backend 550 includes a DB 555 to store data in-memory. The application backend 550 stored data according to a data model. For example, the stored data may be associated with logistic operations related to products provided from different customers at different location facilities. In such an example, the data for the products, customers, locations, etc. may be stored according to a data model defining a set of tables, which are connected based on key identifiers (IDs). Through the UI of the application 510, access to object instances may be provided, when received requests are authenticated and authorization checks are performed. For example, a received request may be associated with reading information for a product "X". Therefore, when such a request is received, the user that sends such a request has to be checked whether he/she is authorized to access and read information for product "X". The definition of authorization rights may be stored are checked, once a request requiring authorization for performing an action is received.

In one embodiment, once a request is received at the application 510, the application 510 communicates the received information with a User Account and Authorization (UAA) service 545. The UAA service 545 may enrich the received request information with information about a user group to which the user is assigned and about an account (tenant) information, which is associated with the user. The enriched information from the UAA service 545 is provided to the application backend 550, where the authorization facade 560 is invoked to determine authorization. The authorization facade 560 takes the information for the received request, information for user groups and tenant information. The authorization facade 560 communicated with an authorization application 540 to receive input associated with capabilities, object group hierarchy, and object group collections.

The authorization application 540 is instantiated to include implemented logic related to authorization of user to perform actions over object instances. The authorization facade 560 invokes the authorization application 540, when generating capability filter term 565. The generated capability filter term 565 may be executed as part of a query over a database storing information for the objects. The authorization application 540 includes a definition of capability types 515, capabilities 525, object group collections 520, and object group hierarchy 530. The capability types 515 may be such as the capability type 220, FIG. 2. The capability types 515 include definitions of vocabularies, which are associated providing authorization to perform actions over objects associated to the application backend 550. A capability type from the capability types 515 is associated with a data model, based on which object instances are created and handled by the application backend 550 and the application 510. The capability types 515 are also based on the object group collections 520, which are collections of groups of objects. The organization of object groups has a hierarchical manner. The capability types 515 are associated with attributes of entities from a data model to describe the objects associated with the application 510. Based on the capability types 515, capabilities 525 are created, which specify how to determine which object instances are associated with which actions to be performed by which users.

The authorization facade 560 takes the information about the capabilities 525 for capabilities types 515, and generates the capability filter term 565, which may be executed on the database, where object instance data is stored. The capability filter term 565 may be generated based on the conditions defined in relevant capabilities from the capabilities 525. The capability filter term 565 may be verified through a verification check performed based on the capability types 515 provided from the authorization application 540. The capability types 515 include the vocabulary, which is used for defining conditions in the capabilities 525. The vocabulary is also used when generating the capability filter term.

The capability filter term may be used as a where clause in a query that is executed on a database such as the DB 555, or the DB I 570. When the query is executed, an authorization result may be generated and provided back to the application 510 to the user 505.

Figure 6:
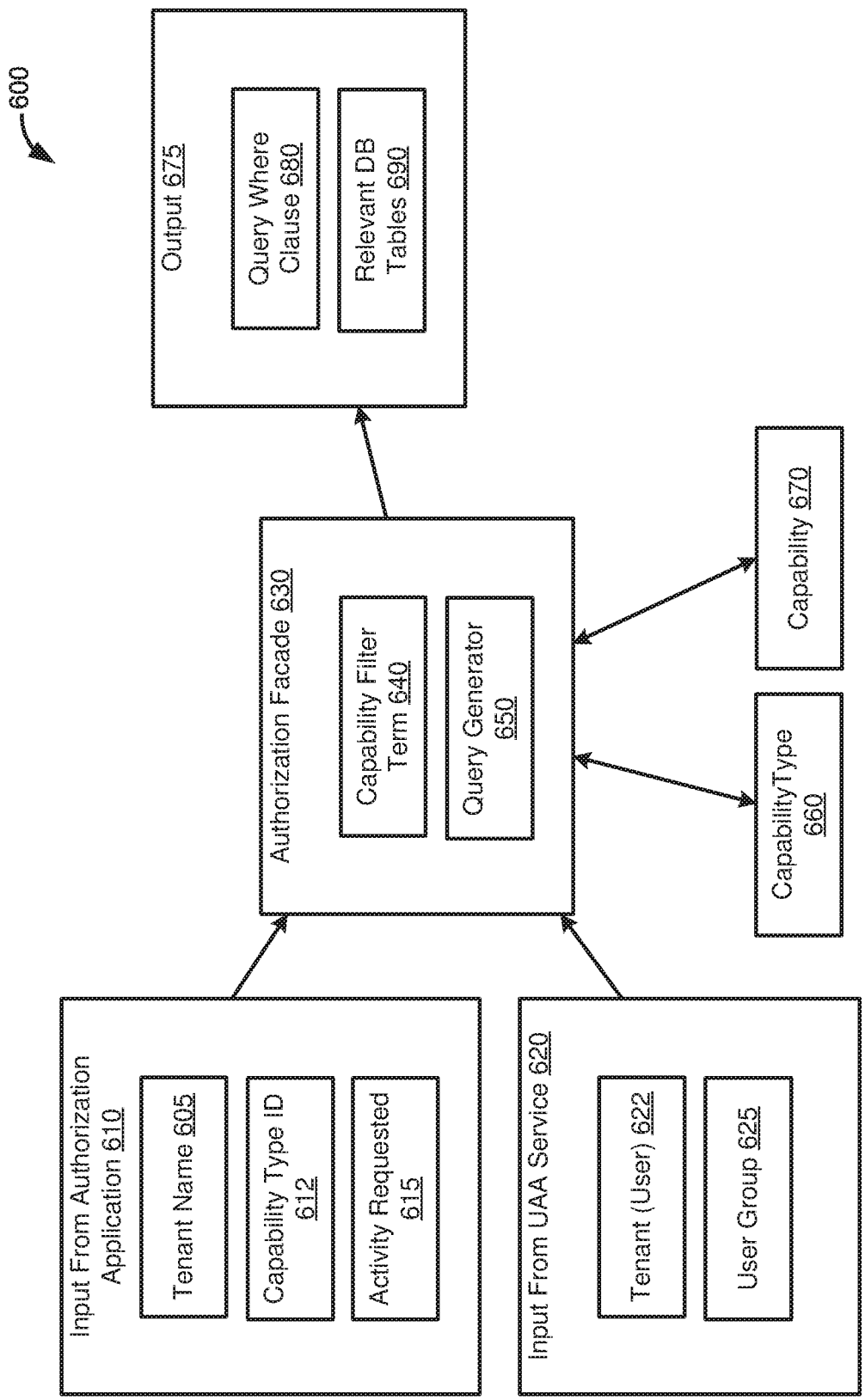
FIG. 6 is a block diagram illustrating a system for generating a query where clause for determining authorization rights for executing an action based on attributes and hierarchy organization, according to one embodiment.

FIG. 6 is a block diagram illustrating a system 600 for generating a query where clause 680 for determining authorization rights for executing an action based on attributes and hierarchy organization, according to one embodiment. An authorization facade 630 is instantiated in relation to an application. The authorization facade 630 may correspond to the authorization facade 560, FIG. 5. The authorization facade 630 is associated with determining authorization rights for users in relation to performing actions over object instances, where the actions are requested through the application, where the object instances are stored at a database related to the application. The authorization is determined in relation to attributes of the object instances and in relation to hierarchy organization of the object instances. The authorization facade 630 receives input and generated output, when requests requiring determination of authorization rights are received at the related application. The authorization application may be such as the authorization application 540. The authorization facade 630 receives input 610 from an authorization application. The authorization application provides input 610, which includes information for a tenant name 605 associated with the user, sending the request for performing actions. The input 610 includes information for a capability type ID 612 and a requested activity 615. The capability type ID 612 is associated with a type of objects, for which the request is sent. For example, if the data objects are described based on a data model, such as the data model 200, FIG. 2, the object instances may be associated with different types of objects, such as cars, motors, bicycles, etc. The capability type ID 612 may be such as the capability type ID 280, in the capability type 250, HG. 2. The capability type ID 612 may be an ID for a capability type from the capability types 515, FIG. 5. The requested activity 615 may be, for example, a displaying activity, requested at the application by user "X" associated with an account "Y". The capability type ID 612 is determined to be associated with the requested activity 615 and the tenant name 605. Based on the capability type IL) 612, a condition to determine a set of objects that the user is authorized for may be determined.

The authorization facade 630 receives also input 620 from a user account and authorization (UAA) service, such as the UAA service 545, FIG. 5. The UAA service provides information for the tenant 622, which information is determined by the UAA service when a request is received at the authorization application. The UAA service determines the tenant 622 information based on received information for a tenant name 605 for the user associated with the request. The input 620 provided by the UAA service includes also information for a user group 625 for the user.

The authorization facade 630 generates a capability filter term 640 based on the input 610 and input 620. The capability filter term 640 is generated in relation to conditions from the capability 670 and is based on the capability type 660. The capability 670 and the capability type 660 are determined based on the provided input 610 and 620. The capability filter term 640 may be validated through performing a validation operation with the capability type 660. At the capability type 660, a vocabulary associated with attributes and hierarchy organization of object instances is created. Therefore, the capability filter term 640 may be validated with respect to a proper definition of terms corresponding to the vocabulary.

The authorization facade 630 includes a query generator 650, which takes the capability filter term, and generate output 675. The output 675 includes a query where clause 680 and relevant database (DB) tables 690. The query where clause 680 is based on the capability filter term 640. The relevant database tables 690 include a set of database tables, where data for object instances is stored. Based on the output 675, a query is generated. The query includes a select clause defining the relevant tables for performing the query, which are the relevant DB tables 690. The query includes a where clause, which is the query where clause 680. The query may he executed in a database.

Figure 7:
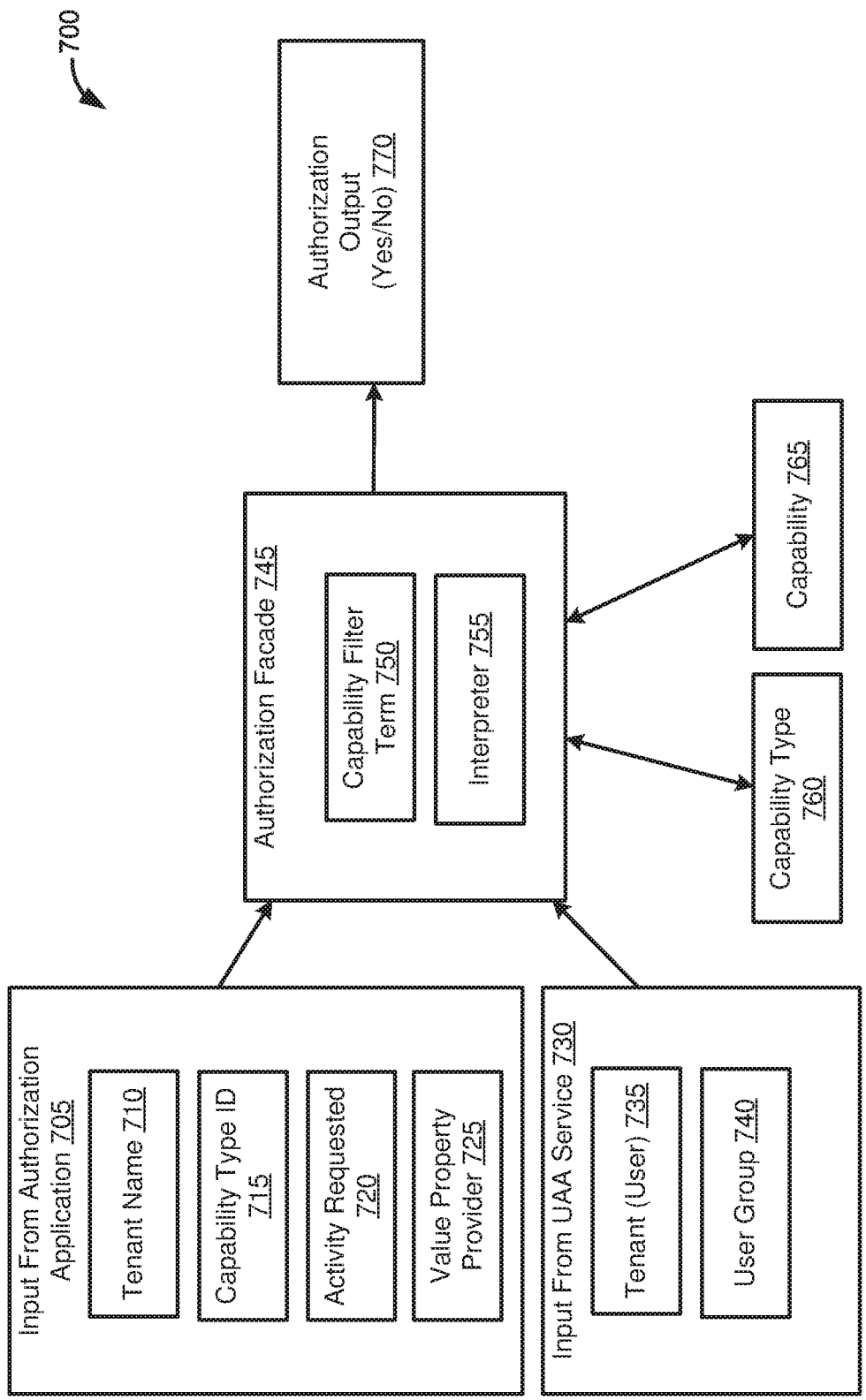
FIG. 7 is a block diagram illustrating a system for determining an authorization results for executing an action based on provided input, according to one embodiment.

FIG. 7 is a block diagram illustrating a system 700 for determining an authorization results for executing an action based on provided input, according to one embodiment. An authorization facade 745 is instantiated to communicate with an application, where requests for performing actions over object instances are received. The authorization facade 745 is related to determining authorization rights for performing the actions. The authorization is determined in relation to attributes of the object instances and in relation to hierarchy organization of the object instances. The authorization Facade 745 may include the functionality provided by the authorization facade 630, FIG. 6.

The authorization facade 745 input and generated output, when requests requiring determination of authorization rights are received at the related application. The authorization application may be such as the authorization application 540. The authorization facade 745 receives input 705 from an authorization application. The authorization application provides input 705, which includes information for a tenant name 710 associated with the user, sending the request for performing actions. The input 705 includes information for a capability type ID 715 and a requested activity 720. The capability type ID 715 is associated with a type of objects, for which the request is sent. For example, if the data objects are described based on a data model, such as the data model 200, FIG. 2, the object instances may be associated with different types of objects, such as cars, motors, bicycles, etc. The capability type ID 715 may be such as the capability type ID 280, in the capability type 250, FIG. :2. The capability type ID 715 may be an ID for a capability type from the capability types 515, FIG. 5. The requested activity 720 may be, for example, a displaying activity, requested at the application by user "X" associated with an account "Y".

The received input 705 may correspond to the input 610, received by the authorization facade 630, with the addition of a value property provider 725 information. The value property provider 725 information may be received, when the request to perform an action, as provided in the activity requested 720, is associated with performing operations to create new objects in the database, associated with the application receiving the request.

The authorization facade 745 receives input 730 from a user account and authorization service. The input 730 may correspond to the input 620, received by the authorization facade 630, FIG. 6. The UAA service provides information for the tenant 710, which information is determined by the UAA service, when a request is received at the authorization application. The UAA service determines the tenant 735 information based on received information for a tenant name 710 for the user associated with the request. The input 730 provided by the UAA service includes also information for a user group 740 for the user.

The authorization facade 745 may have implemented logic to generate a capability filter term 750 corresponding to the capability filter term 64(1 The authorization facade 745 may include logic related to an interpreter 755, where the capability filter term 750 may be interpreted and an authorization output (Yes/No) 770 may be generated.

Figure 8:
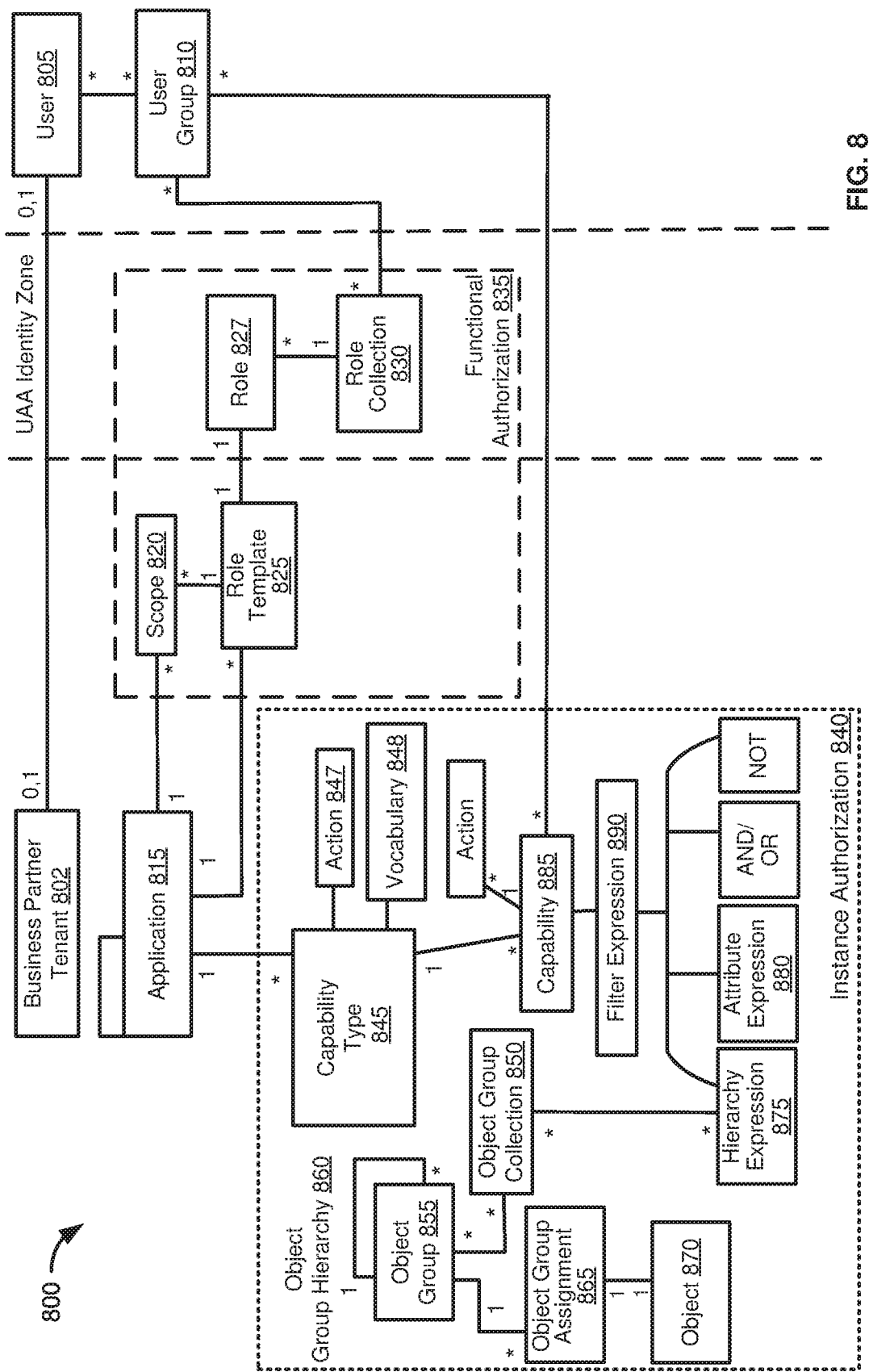
FIG. 8 is a block diagram illustrating an architectural structure of a system environment for determining authorization rights for executing an action based on attributes and hierarchy organization, according to one embodiment.

FIG. 8 is a block diagram illustrating an architectural structure of a system environment 800 for determining authorization rights for executing an action based on attributes and hierarchy organization, according to one embodiment. An application 815 is defined for providing services to users, such as user 805. The user 805 is part of an account for a business partner tenant 802. The account of the business partner tenant 802 is defined for the application 815 in relation to performing actions and operations provided through the functionality of the application 815. The user 805 is associated with a user group 810. The application 815 is associated with scope 820. The application 815 may be associated with a number of scopes such as scope 820. The scope 820 is associated with a role template 825. Multiple scopes may be related to one role template. The scope 820 defines authorization right for performing actions through the application 815 over object instances associated with the application 815. Based on the role template 825, a role 827 may be defined to be associated with the set of scopes. For the application 815, a number of roles may he defined according to a number of role templates. The number of roles, such as role 827, may be grouped to form a role collection 830. A role collection 830 may be mapped to a user group 810. The mapping between role collection 830 and user group 810 may be many to many. The definition of scopes (such as scope 820), roles (such as role 827), based on role templates (such as role template 825), and role collections of roles, represent functional authorization 835 for users associated with the application 815.

In one embodiment, an instance authorization 840 may be defined for the application 815. The instance authorization 840 is associated with attribute characteristics of object instances and with hierarchy organization of the object instances. For the application 815, a capability type 845 may be defined. The capability type 845 is associated with an action 847 and a vocabulary 848. The capability type 845 may be such as the capability type 250, FIG. 2. The action 847 includes actions, which may be performed on object instances associated with the application 815. The vocabulary 848 includes a definition of attributes and assignment of objects to object groups and object group collections according to a hierarchy organization. The definition of attributes is associated with authorization to perform an action by a user over object instances, related to object 870. The assignment of objects to object groups and object group collection is related to an object group hierarchy 860.

The object group hierarchy 860 is based on a object group 855. The object group hierarchy 860 is related to a number of object groups. The object group hierarchy 860 may be presented as a tree organization, where an object group is defined as a node of the hierarchy. The object group 855 includes a number of objects, such as object 870. The object 870 is associated with an object group assignment 865 record. One object, such as object 870 may be associated with one object group assignment. An object group, such as object group 855 is associated with a number of object group assignments of objects, as a group includes a set of objects. Based on the object group hierarchy 860, object group collection 850 is defined. The object group collection 850 is associated with a number of object groups from the object group hierarchy 860. The object group 855, the object group hierarchy 860, and the object group collection 850 may be such as those discussed in relation to FIG. 3A and FIG. 3B.

The object group collection 850 may be defined to include or exclude object groups. The definition of object group collections may be associated with generation of explosion tables, such as the discussed explosion table (Table 3) above and the discussion in relation to FIGS. 3A and 3B.

Based on the capability type 845, a capability 885 is defined. The capability 885 includes conditions, such as conditions based on the vocabulary 275 for capability "A" 260, FIG. 2. The condition is defined according to the vocabulary 848. The capability 885 is related to one or more actions, which actions are selected from the actions from the capability type, as in the action 847 block. The capability 885 is related to a definition of a filter expression 890. The filter expression 890 includes a hierarchy expression 875, attribute expression 880, and operators such as "AND" and "OR", or a negation "NOT". The hierarchy expression 875 is related to assignment of objects to object groups and object group collections. The attribute expression 880 is related to definition of attributes associated with authorization to perform an action by a user, as defined in the vocabulary 848. The relation between an object group collection 850 and a hierarchy expression 875 is many to many. The definition of the filter expression 890 is unified in relation to generating both hierarchy expressions and attribute expressions. Such filter expression 890 may be used in a query where clause and executed in a database environment. Examples of filter expressions are presented in Table 5.

TABLE 5

Entity.Tenant = ,T1'
Entity.Tenant = ,T1' AND assignment1.ObjectGroup IN (OGC1.1)
Entity.Tenant = ,T1' AND <attributeSelection1>
Entity.Tenant = ,T1' AND (assignment1.ObjectGroup IN (OGC1.1)) AND <attributeSelection1>
Entity.Tenant = ,T1' AND (assignment1.ObjectGroup IN (OGC1.1)) OR <attributeSelection1>
Entity.Tenant = ,T1' AND (assignment1.ObjectGroup IN (OGC1.1) AND <attributeSelection1> OR assignment1.ObjectGroup IN (OGC1.2) AND <attributeSelection2> )
Entity.Tenant = ,T1' AND assignment2.ObjectGroup IN (OGC2.1)

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may he linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
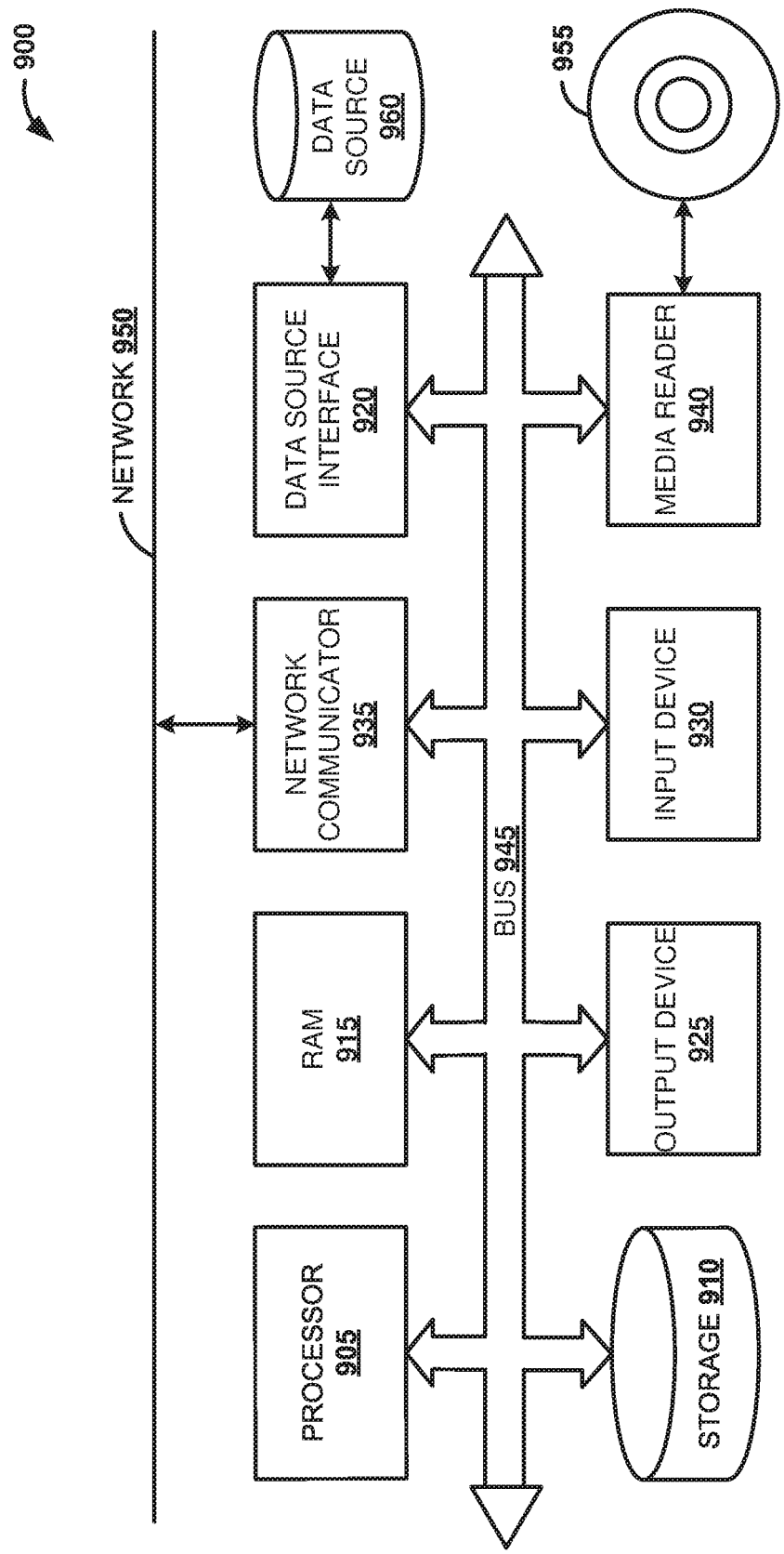
FIG. 9 is a block diagram illustrating an embodiment of a computing environment in which the techniques described for providing authorization for executing an action on object instances to users based on defined capabilities can be implemented.

FIG. 9 is a block diagram of an exemplary computer system 900. The computer system 900 includes a processor 905 that executes software instructions or code stored on a computer readable storage medium 955 to perform the above-illustrated methods. The processor 905 can include a plurality of cores. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. According to some embodiments, such as some in-memory computing system embodiments, the RAM 915 can have sufficient storage capacity to store much of the data required for processing in the RAM 915 instead of in the storage 910. In some embodiments, all of the data required for processing may be stored in the RAM 915. The stored instructions may be further compiled to generate other representations of the instructions and dynamically stored in the RAM 915. The processor 905 reads instructions from the RAM 915 and performs actions as instructed. According to one embodiment, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output devices 925 and input devices 930 could he joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to he exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for determining authorization rights for executing one or more actions based on one or more attributes and a hierarchy organization of objects, the method comprising:
    defining a hierarchy of one or more object groups;
    defining an object group collection, wherein the object group collection comprises at least one object group from the one or more object groups, wherein the object group collection inherently comprises one or more inherent object groups that are in parent-child relationships to an object group of the at least one object group and are at a relatively lower hierarchical level than the object group in the hierarchy, wherein the object group collection is associated with an identification number;
    excluding an inherent object group of the one or more inherent object groups from the object group collection;
    creating a vocabulary including definitions of the one or more attributes of objects and including definitions of hierarchy assignments of objects to the one or more object groups in the hierarchy;
    defining a capability to specify authorization to perform an action from the one or more actions by a user on a set of objects, wherein the capability includes a condition based on the vocabulary to define the set of objects, wherein the condition is generated based on the vocabulary such that the condition comprises one or more predetermined values of the one or more attributes of objects that are defined for the vocabulary for determining the set of objects, wherein the condition further comprises at least one predetermined value of the hierarchy assignments of objects;
    generating a filtering expression based on the capability when a request to perform the action by the user is received; and
    executing a query including the filtering expression to determine the set of objects based at least in part on the one or more predetermined values of the one or more attributes of objects and the at least one predetermined value of the hierarchy assignments of objects that are specified in the condition, wherein the at least one predetermined value of the hierarchy assignments of objects comprises at least one identification number of the object group collections.

2. The method of claim 1, further comprising:
    defining the one or more attributes of objects with corresponding entities defined in a data model to describe the objects, wherein the one or more attributes are associated with providing the authorization rights for executing the one or more actions on object instances of the objects.

3. The method of claim 1, wherein an object group collection includes an object group from the one or more object groups, wherein the included object group comprises one or more inherent object groups of the included object group as defined in the hierarchy of the one or more object groups.

4. The method of claim 3, further comprising:
    defining an explosion table associated with the object group collection, wherein the explosion table comprises a record for the included object group and comprises records for the one or more inherent object groups,
    wherein the object group collection is defined to exclude an object group from the one or more inherent object groups, and
    wherein a row from the explosion table includes a definition of an object group, a corresponding object group collection, and an inclusion status identifying whether the object group is part of the object group collection.

5. The method of claim 1, wherein executing the query further comprises:
    generating the query to include the filtering expression in a where clause of the query, wherein in a select clause of the query a set of relevant tables from a database is defined, wherein the database is storing data for the objects.

6. The method of claim 1, further comprising:
    determining an authorization result based on executing the query to be provided to the user.

7. The method of claim 1, wherein the filtering expression comprises an attribute expression and a hierarchy expression, and wherein the executing a query including the filtering expression comprises executing the attribute expression and the hierarchy expression.

8. A computer system to determine authorization rights for executing one or more actions based on one or more attributes and a hierarchy organization of objects, comprising:
   a processor;
   a memory in association with the processor storing instructions related to:
      define a hierarchy of one or more object groups;
      define an object group collection, wherein the object group collection comprises at least one object group from the one or more object groups, wherein the object group collection inherently comprises one or more inherent object groups that are in parent-child relationships to an object group of the at least one object group and are at a relatively lower hierarchical level than the object group in the hierarchy, wherein the object group collection is associated with an identification number;
      exclude an inherent object group of the one or more inherent object groups from the object group collection;
      create a vocabulary including definitions of the one or more attributes of objects and including definitions of hierarchy assignments of objects to the one or more object groups in the hierarchy;
      define a capability to specify authorization to perform an action from the one or more actions by a user on a set of objects, wherein the capability includes a condition based on the vocabulary to define the set of objects, wherein the condition is generated based on the vocabulary such that the condition comprises one or more predetermined values of the one or more attributes of objects that are defined in the vocabulary for determining the set of objects, wherein the condition further comprises at least one predetermined value of the hierarchy assignments of objects;
      generate a filtering expression based on the capability when a request to perform the action by the user is received; and
      execute a query including the filtering expression to determine the set of objects based at least in part the one or more predetermined values of the one or more attributes of objects and the at least one predetermined value of the hierarchy assignments of objects that are specified in on the condition, wherein the at least one predetermined value of the hierarchy assignments of objects comprises at least one identification number of the object group collections.

9. The system of claim 8, further comprising instructions to:
   define the one or more attributes of objects with corresponding entities defined in a data model to describe the objects, wherein the one or more attributes are associated with providing the authorization rights for executing the one or more actions on object instances of the objects.

10. The system of claim 8, wherein an object group collection includes an object group from the one or more object groups, wherein the included object group comprises one or more inherent object groups of the included object group as defined in the hierarchy of the one or more object groups.

11. The system of claim 10, further comprising instructions to:
   define an explosion table associated with the object group collection, wherein the explosion table comprises a record for the included object group and comprises records for the one or more inherent object groups,
   wherein the object group collection is defined to exclude an object group from the one or more inherent object groups, and
   wherein a row from the explosion table includes a definition of an object group, a corresponding object group collection, and an inclusion status identifying whether the object group is part of the object group collection.

12. The system of claim 8, wherein the instructions to execute the query further comprise instructions to:
   generate the query to include the filtering expression in a where clause of the query, wherein in a select clause of the query a set of relevant tables from a database is defined, wherein the database is storing data for the objects.

13. The system of claim 8, further comprising instructions to:
   determine an authorization result based on executing the query to be provided to the user.

14. A non-transitory computer-readable medium storing instructions, which when executed cause a computer system to:
   define a hierarchy of one or more object groups;
   define an object group collection, wherein the object group collection comprises at least one object group from the one or more object groups, wherein the object group collection inherently comprises one or more inherent object groups that are in parent-child relationships to an object group of the at least one object group and are at a relatively lower hierarchical level than the object group in the hierarchy, wherein the object group collection is associated with an identification number;
   exclude an inherent object group of the one or more inherent object groups from the object group collection, wherein excluding the inherent object group inherently excludes one or more particular inherent object groups from the object group collection, wherein the one or more particular inherent object groups are in parent-child relationships to the inherent object group and are at a relatively lower hierarchical level than the inherent object group in the hierarchy;
   create a vocabulary including definitions of one or more attributes of objects and including definitions of hierarchy assignments of objects to the one or more object groups in the hierarchy;
   define a capability to specify authorization to perform an action from one or more actions by a user on a set of objects, wherein the capability includes a condition based on the vocabulary to define the set of objects, wherein the condition is generated based on the vocabulary such that the condition comprises one or more predetermined values of the one or more attributes of objects that are defined in the vocabulary for determining the set of objects, wherein the condition further comprises at least one predetermined value of the hierarchy assignments of objects;
   generate a filtering expression based on the capability when a request to perform the action by the user is received; and
   execute a query including the filtering expression to determine the set of objects based at least in part on the one or more predetermined values of the one or more attributes of objects and the at least one predetermined value of the hierarchy assignments of objects that are specified in the condition, wherein the at least one predetermined value of the hierarchy assignments of objects comprises at least one identification number of the object group collections.

15. The computer-readable medium of claim 14, further comprising instructions to:
define the one or more attributes of objects with corresponding entities defined in a data model to describe the objects, wherein the one or more attributes are associated with providing authorization rights for executing the one or more actions on object instances of the objects.

16. The computer-readable medium of claim 15, wherein an object group collection includes an object group from the one or more object groups, wherein the included object group comprises one or more inherent object groups of the included object group as defined in the hierarchy of the one or more object groups.

17. The computer-readable medium of claim 16, further comprising instructions to:
define an explosion table associated with the object group collection, wherein the explosion table comprises a record for the included object group and comprises records for the one or more inherent object groups,
wherein the object group collection is defined to exclude an object group from the one or more inherent object groups, and
wherein a row from the explosion table includes a definition of an object group, a corresponding object group collection, and an inclusion status identifying whether the object group is part of the object group collection.

18. The computer-readable medium of claim 14, wherein the instructions to execute the query further comprise instructions to:
generate the query to include the filtering expression in a where clause of the query, wherein in a select clause of the query a set of relevant tables from a database is defined, wherein the database is storing data for the objects.

19. The computer-readable medium of claim 14, further comprising instructions to:
determine an authorization result based on executing the query to be provided to the user.

\* \* \* \* \*